United States Patent
Wenzel et al.

(10) Patent No.: US 8,517,018 B2
(45) Date of Patent: Aug. 27, 2013

(54) OXYGEN SUPPLY SYSTEM FOR AN AIRCRAFT

(75) Inventors: Jürgen Wenzel, Köln (DE); Martin Wittkowski, Bonn (DE); Walter Deutscher, Dassendorf (DE); Jörn Schecker, Hamburg (DE); Norbert Luks, Siegburg (DE); Simon Knaak, Hamburg (DE)

(73) Assignee: Airbus Operations GmbH (DE)

( * ) Notice: Subject to any disclaimer, the term of this patent is extended or adjusted under 35 U.S.C. 154(b) by 796 days.

(21) Appl. No.: 12/600,006

(22) PCT Filed: May 13, 2008

(86) PCT No.: PCT/EP2008/055845
§ 371 (c)(1),
(2), (4) Date: Nov. 30, 2009

(87) PCT Pub. No.: WO2008/138930
PCT Pub. Date: Nov. 20, 2008

(65) Prior Publication Data
US 2010/0139658 A1 Jun. 10, 2010

Related U.S. Application Data

(60) Provisional application No. 60/930,084, filed on May 14, 2007.

(51) Int. Cl.
*A62B 7/00* (2006.01)
*A62B 18/02* (2006.01)
*A61M 16/00* (2006.01)

(52) U.S. Cl.
USPC ............ 128/205.14; 128/204.26; 128/205.13; 128/205.17; 128/205.25

(58) Field of Classification Search
USPC ............ 128/204.18, 204.23, 204.26–204.29, 128/205.13–205.17, 205.25
See application file for complete search history.

(56) References Cited

U.S. PATENT DOCUMENTS

| 3,252,470 A | 5/1966 | Elly et al. |
| 4,499,914 A * | 2/1985 | Schebler ...................... 137/81.1 |

(Continued)

FOREIGN PATENT DOCUMENTS

| EP | 1275416 A1 | 1/2003 |
| GB | 1086586 A | 10/1967 |
| WO | 2006086044 A2 | 8/2006 |

*Primary Examiner* — Justine Yu
*Assistant Examiner* — Douglas Sul
(74) *Attorney, Agent, or Firm* — Lerner, David, Littenberg, Krumholz & Mentlik, LLP (57) ABSTRACT

An oxygen supply system for an aircraft includes a control valve, a reservoir bag, a respiration device and a sensor device, wherein the control valve is designed in such a way that oxygen can be supplied to the reservoir bag until a predetermined quantity of oxygen is adjusted in the reservoir bag. The respiration device may be designed in such a way that breathing gas can be provided for a passenger. The sensor device may be designed in such a way that an exhalation is detectable. The reservoir bag may be designed in such a way that a predetermined quantity of oxygen can be metered into the reservoir bag during the exhalation. The reservoir bag may be designed in such a way that breathing gas can be supplied to the respiration device in a pulse-like fashion. The oxygen supply system may include a first and a second operation mode.

14 Claims, 4 Drawing Sheets

(56) References Cited

U.S. PATENT DOCUMENTS

| | | |
|---|---|---|
| 4,651,728 A | 3/1987 | Gupta et al. |
| 4,919,124 A * | 4/1990 | Stevenson et al. ....... 128/202.26 |
| 6,220,244 B1 | 4/2001 | McLaughlin |
| 6,789,539 B2 * | 9/2004 | Martinez ................. 128/204.26 |
| 6,796,306 B2 | 9/2004 | Martinez |
| 2006/0118115 A1 * | 6/2006 | Cannon ................... 128/204.26 |
| 2008/0000280 A1 | 1/2008 | Dickinson |

* cited by examiner

Fig. 4

OXYGEN SUPPLY SYSTEM FOR AN AIRCRAFT

CROSS-REFERENCE TO RELATED APPLICATIONS

This application is a national phase entry under 35 U.S.C. §371 of International Application No. PCT/EP2008/055845, filed May 13, 2008, published in English, which claims the benefit of the filing date of U.S. Provisional Patent Application No. 60/930,084 filed May 14, 2007, the disclosures of which applications are hereby incorporated herein by reference.

FIELD OF THE INVENTION

The present invention relates to an oxygen supply system for an aircraft, as well as to a method for supplying a passenger with oxygen in an aircraft.

TECHNOLOGICAL BACKGROUND

The auxiliary or supplemental oxygen supply in commercial aircraft, in particular, after losing the integrity of the pressurized cabin is generally realized with Constant-Flow or Demand systems. While the latter are reserved for the cockpit crew—and usually have an overpressure function and a Quick-Donning design—only Constant-Flow masks according to TSO64, (TSO-C64a)—that typically comprise a reservoir bag—have been used so far in the cabin area.

One decisive disadvantage of the Constant-Flow concept is the lack of controllability. For the range above 18 kft (18 000 feet), the controller or regulator provides a respiratory volume per minute of 30 l/min as worst-case scenario, wherein this respiratory volume may, at worst, occur over a duration of a few minutes for a few passengers and stands in contrast to a typical value of 6-8 l/min. Since the extreme value may occur at any respiratory connection, which means the outlet to the passenger, all connections need to be operated with an increased oxygen dosage that results in oxygen losses of 30-70% in comparison with an optimized supply. On the other hand, the low technical complexity of this system is exceptionally advantageous and cost-efficient, wherein the utilization of a Demand system as it is used in the cockpit area cannot be considered for numerous reasons. One possible alternative that has been offered by several manufacturers for a few years is the so-called pulse-dosed system, in which a brief oxygen blast is introduced into the respective respiratory connection via a correspondingly controlled valve or control valve when the beginning of the inhalation phase is detected. This makes it possible to individually adapt the demand at each respiration point—the metering takes place in accordance with the breathing rate—and the pulse width and therefore the admixed quantity per breath can be controlled in dependence on the altitude. Due to the introduction of the oxygen in the first stage of the inhalation phase, the oxygen reaches the deep airways, which form the lower portions of the lungs (alveoli) where the actual gas exchange takes place; the last stage of the inhalation phase only reaches the supplying or conducting airways, in which the oxygen supplied with other systems cannot be utilized. One certain disadvantage of this very economical system is the frequently unreliable detection of the respiratory activity, e.g., if the mask leaks; this results in oxygen only being admixed during a few breaths or, in extreme instances, not at all. Between the beginning of the inhalation phase and the arrival of the oxygen dose in the upper airways, a certain delay time elapses that contradicts the ideal function of the system; in addition, one has to consider the insufficient fulfillment of the requirement for making available pure oxygen in the maximum altitude range beginning at approximately 35 kft (35 000 feet) such that the approval of this system, in particular, above 40 kft (40 000 feet) is highly questionable.

SUMMARY OF THE INVENTION

There may be a need of making available a more efficient oxygen supply.

According to an exemplary embodiment of the invention an oxygen supply system for an aircraft is provided, wherein the said system comprises a control valve, a reservoir bag, a respiration device and a sensor device, wherein the control valve is designed in such a way that oxygen can be supplied to the reservoir bag until a predetermined quantity of oxygen is adjusted in the reservoir bag. The respiration device may be designed in such a way that breathing gas can be provided for a passenger. The sensor device may be designed in such a way that an exhalation is detectable. The reservoir bag may be designed in such a way that a predetermined quantity of oxygen can be metered into the reservoir hag during the exhalation. Moreover the reservoir bag may be designed in such a way that breathing gas can be supplied to the respiration device in a pulse-like fashion. The oxygen supply system may comprise a first operation mode and a second operation mode.

Such a system with two different operation modes may be used for multiple purposes. This means that an amount of oxygen in each flight may be reduced. In respect to aircraft the weight may be a dominant parameter which has to be taken into account at a time when an aircraft is constructed and also when the aircraft is in operation. The proposed system with at least two operation modes may substitute two or more systems which helps also to save weight. The terms first operation mode and second operation mode should be understood in the way that the system may be operated in at least two different ways, wherein non-operation is not regarded as an operation mode. It may be foreseen that the reservoir bag is installed downstream in relation to the control valve. This would have the advantage that the control valve is used for a dosage of the amount of oxygen supplied to the reservoir bag.

According to an exemplary embodiment of the invention the oxygen supply system the first operation mode is an on demand oxygen supply mode.

An on demand mode may save oxygen in an aircraft, since only on demand of a passenger oxygen will be made available. The on demand mode may also include that the supply depends on the breathing characteristic of the passenger, such as breathing frequency, breathing volume and breathing pressure. In the on demand mode the control valve may be in an open position for a certain time and may be in an closed position for a certain time. The time of open and closed positions of the control valve may be chosen individually for each passenger.

According to an exemplary embodiment of the invention the second operation mode is a permanent oxygen supply mode.

This means that no interruption of oxygen supply takes place. In this case the control valve may be permanently opened. This second operation mode may be used if no sufficient safety in respect to oxygenation for the passenger is provided by the on demand mode.

According to an exemplary embodiment of the invention the oxygen supply system is switchable from the first operation mode to the second operation mode based on a first parameter.

An advantageous property of the system is a selectable first parameter which may be generated by a measurement with the help of one or several sensors, wherein the one or more sensors may be a part of the respiration device, especially the mask itself. It is also possible that the first parameter is provided by the aircraft system, for example the navigation system. It would also be possible that the first parameter is received from a ground location or a satellite connection or the like. Therefore the first parameter may be any suitable parameter, wherein the first parameter could also be measured in real time. The first parameter could represent the present flight situation of the aircraft. Suitable first parameters may be the altitude of the aircraft, the pressure inside the cabin of the aircraft, a differential pressure, a temperature inside or outside the aircraft. Also possible would be a humidity, a chemical ingredient of a gas, such as an oxygen content or a carbon dioxide content and the like. These proposed first parameters are not limited to the given examples, further suitable signals or characteristic values may be chosen as first parameter.

According to an exemplary embodiment of the invention the oxygen supply system is switchable from the second operation mode to the first operation mode based on a second parameter.

The second parameter may be a selectable parameter which may be generated by a measurement with the help of one or several sensors. It is also possible that the second parameter is provided by the aircraft system, for example the navigation system. It would also be possible that the first parameter is received from a ground location or a satellite connection or the like. It may also be possible that the one or more sensors may be a part of the respiration device, especially the mask itself. Therefore the second parameter may be any suitable parameter, wherein the second parameter could also be measured in real time. The second parameter could represent the present flight situation of the aircraft. Suitable second parameters may be the altitude of the aircraft, the pressure inside the cabin of the aircraft, a differential pressure, a temperature inside or outside the aircraft, a temperature of the breathing air of a passenger, humidity, a chemical ingredient of a gas, such as an oxygen content or a carbon dioxide content and the like. It may be possible and also of advantage when the second parameter is the same as the first parameter. This would ensure an easy control of the whole system and also reduce sensors to provide a suitable parameter. These proposed second parameters are not limited to the given examples, further suitable signals or characteristic values may be chosen as second parameter.

According to an exemplary embodiment of the invention at least one of the first parameter and the second parameter is an altitude.

The altitude of the aircraft may be available in an easy way, since it may also be measured for other purposes such as navigation. In such a case no further sensors and no further measuring equipment would be necessary in order to provide a parameter.

According to an exemplary embodiment of the invention the altitude is in a range of 25 000 ft to 45 000 ft.

In this range of altitude there may occur a critical situation in such a way that the blood of a passenger may not be oxygenated in the lungs anymore when ambient air is breathed or a mixture of ambient air and supplied oxygen. Therefore it may be of advantage when the oxygen supply system of the aircraft is suitable to react without any delay to such a situation. In this range of about 25 000 ft to about 45 000 ft a pure oxygen supply may be initiated. This range covers a regular traveling altitude where a pressure drop may occur. A constant flow of oxygen may be used in such an altitude range. In addition this range of altitude may be a common traveling altitude in order to fly in a more economic way and therefore saving economic resources.

According to an exemplary embodiment of the invention the altitude is essentially 35 000 ft.

The altitude of 35 000 ft may be a critical parameter in regard to the oxygen demand of a passenger. It seems to be suitable above such an altitude to use a permanent oxygen supply mode. Below this altitude of 35 000 ft is seems to be sufficient to supply oxygen in a demand operation mode without having disadvantages for the passenger. The parameter of 35 000 ft may be used as a threshold. When the cabin is above an altitude of 35 000 ft then this parameter may be used for the oxygen supply system to change the operation mode. This may initiate a change from the first operation mode to the second operation mode when the cabin altitude is rising, wherein the cabin altitude is related to the cabin pressure inside the aircraft. This may initiate a change from the second operation mode to the first operation mode when the cabin altitude is decreasing or when the aircraft is on a dive.

According to an exemplary embodiment of the invention a third parameter is one out of a group, the group consisting of a temperature inside the mask, a temperature on the mask, a temperature of the breathing air of a passenger, a temperature inside the aircraft, a temperature outside the aircraft, a humidity, a differential pressure, an absolute pressure, a breathing gas composition, an amount of a carbonic acid gas, a pressure of the respiration system of the passenger, a breathing frequency, a chemical ingredient of a gas, an oxygen content, a carbon dioxide content, a chemical ingredient of a breathing gas, a chemical ingredient of a gas inside the mask.

Also suitable for a third parameter in addition to the first and/or the second parameter would be an altitude of the aircraft, a pressure inside the cabin of the aircraft, pressure outside the aircraft, a chemical ingredient of a gas inside the aircraft and a chemical ingredient outside the aircraft. The proposed third parameters are not limited to the given examples, further suitable signals or characteristic values may be chosen as third parameter. The third parameter may be used to control the oxygen supply provided by the oxygen supply system inside the aircraft in the case of a pressure drop. Also a combination of at least two third parameters would be suitable to detect a need of oxygen for a passenger.

Some of these parameters may be suitable to detect the individual exhalation of the passenger. This would have the advantage to supply an individual amount of oxygen to each passenger and also an individual time of supply would be possible. For this purposes especially one of the parameters of humidity, temperature, pressure and carbon dioxide content would be suitable. The exhaled air of a passenger may be characterized by these parameters.

A temperature inside the mask is the temperature of the breathing air of a passenger. Also a switch at an exhaustion valve of the respiration device may be suitable in order to detect the individual exhalation of the passenger. The third parameter may be measured with the help of sensors at the respiration device itself. This would have the advantage that the breathing activity of the passenger would be detectable individually for each passenger. The pressure measurement may be based on an absolute pressure measurement or a differential pressure measurement. A suitable pressure would be the pressure inside the mask, especially inside a cup-like portion of the mask which may cover the nose of the passenger or the mouth of the passenger or both of them. Such an individual oxygen supply is adapted to the passengers need during using the mask.

According to an exemplary embodiment of the invention the respiration device comprises an exhalation valve and a switch, wherein the switch is controllable by the exhalation valve.

A switch may be used to detect the breathing activity of the passenger. This switch could be installed close to an exhalation valve of the respiration device. It is of advantage if the switch is activated when an exhalation of the passenger is detected. This detection could be provided by the exhalation valve.

According to an exemplary embodiment of the invention the oxygen supply system comprises a controller, wherein the controller is connected to the control valve.

A controllable valve by a controller may be used for different purposes, wherein the controller comprises a control logic which may be programmable. The controller may control the different operation modes of the oxygen supply system. When controlling the control valve it is possible to ensure in a first operation mode which may be a pulsed operation mode with a non-permanent oxygen supply and in the second operation mode a permanent oxygen supply. The controller may comprise a logic which is connected to a switch of the exhalation valve. Since the time of open and closed positions of the control valve may be chosen individually for each passenger it is of advantage when each respiration device comprises a controller. This may ensure an individual oxygen supply depending on certain needs of a passenger independent on further oxygen supply to other passengers.

According to an exemplary embodiment of the invention a method for supplying a passenger with oxygen in an aircraft is provided. The method comprises detecting an exhalation phase of a passenger, metering a predetermined quantity of oxygen to the breathing gas into a reservoir bag during the exhalation phase of the passenger, and supplying the breathing gas from the reservoir bag to a respiration device in a pulse-like fashion, wherein operating in a first operation mode or in a second operation mode is determined by a selectable parameter.

A pulse-like fashion gas supply may be provided by controlling a control valve.

According to an exemplary embodiment of the invention the method further comprises determining an altitude as a selectable parameter.

The altitude may be a suitable parameter for detecting the oxygen need of a passenger. The altitude may be a pre-selected or may be measured in real time during the flight of the aircraft.

According to an exemplary embodiment of the invention the method further comprises determining a pressure as a selectable parameter.

The determination of the pressure may be performed by using an absolute or a differential pressure sensor. An absolute pressure measurement would have the advantage that the measurement is robust against environmental influences. The measured absolute pressure could be the pressure inside the mask when used by a passenger or the pressure inside the aircraft cabin. A differential pressure measurement would have the advantage that a pressure inside the mask of the passenger when breathing through the mask may be used and a second pressure outside the mask may be used, for example the pressure of the aircraft cabin. This would also ensure an individual oxygen supply for each passenger. The pressure would change in dependence of the breathing of the passenger. Therefore it would also be possible to detect the changing from the exhalation to the inhalation phase or the changing from the inhalation phase to the exhalation phase in order to receive a characteristic value for a trigger signal. A suitable pressure would also be the pressure inside the cabin of the aircraft. Outside the aircraft the pressure would also be a suitable parameter in order to determine the altitude of the aircraft.

According to an exemplary embodiment of the invention the method comprises further controlling the control valve in dependence of a pre-selected first operation mode or of a pre-selected second operation mode.

The pre-selection of the present operation mode may depend on the altitude of the aircraft and/or on other parameters like the pressure inside the aircraft cabin or temperature. Thereby possible parameters could be used as a single parameter or a combination of at least two parameters, for example the parameter of altitude in combination with the parameter of pressure or the parameter of altitude in combination with the parameter of temperature.

One exemplary embodiment of the invention may comprise a combination of the traditional TSO mask and the pulse method, wherein an oxygen pulse is metered into the reservoir bag during the exhalation phase. This merely requires the detection of the exhalation phase and a correspondingly controlled valve, as well as the software required for realizing the control and the altitude adaptation. The altitude adaptation itself may be realized by centrally determining the internal cabin pressure with the corresponding system of the aircraft and, if applicable, forwarding the internal cabin pressure via a data bus, or it would also possible to carry out a decentralized measurement near the mask. After the detection of the exhalation phase, the control valve is opened until a quantity of oxygen that corresponds to the altitude is stored in the reservoir bag, wherein this quantity of oxygen results from the relation between admission pressure and opening time and needs to be defined during the design phase in series of measurements on subjects in the altitude chamber. During the ensuing inhalation phase, the pure oxygen initially reaches the deep airways, especially the alveoli in the deep airways, where it can be optimally utilized, wherein the last portion inhaled—after the reservoir bag is emptied—consists of ambient air only.

Trigger options other than the complicated and malfunction-prone differential pressure evaluation of the inhalation phase (that naturally can also be used for the exhalation phase due to the generally higher peak flows during the exhalation phase, however, with improved reliability) may also be considered in this case, e.g., the exhalation temperature in the mask or a switch on the exhalation valve as illustrated in one of FIGS. 1 to 4. It is advantageous with respect to the pulse function that the oxygen dose required for each inhalation phase may already be stored in the reservoir bag during the exhalation phase such that the typical delay time of conventional pulse systems (see above) can be eliminated.

In the range above 35 kft (35 000 feet), the control valve may remain permanently open such that the system operates in the same fashion as the systems that have been used for decades. In high altitudes the partial pressure of oxygen in the ambient air and therefore in the lungs may drop to a value below the oxygen partial pressure in the venous blood. Due to this the blood may not be oxygenated in the lungs anymore when ambient air is breathed in these altitudes. The transport time of the blood from the lung to the brain may be approximately ten seconds. If this blood reaches the central nervous system an immediate loss of consciousness may be the consequence. This loss of consciousness may even happen when an oxygen mask is immediately donned and put in place. Therefore the mask may be secured in place with the head-strap.

It may occur that the mask is not perfectly fit in place within this short time, considering the disturbing emergency situation and the fact that the passenger is unaccustomed to use an oxygen mask. This leaves the passenger in a situation where he is probably unconscious with reduced respiration and wearing a leaking oxygen mask. A demand operated mask may need a sufficient trigger signal to activate the oxygen flow for each breath. Therefore an insufficient pressure differential may be built up. The leakage and reduced respiratory function of the passenger may prevent this pressure build up, thus no oxygen pulse may be activated and the situation of the passenger will not improve.

When in the very same situation the oxygen may be distributed in a constant flow to the mask, the reservoir bag will overflow and oxygen will flow into the mask without requiring any breathing activity from the passenger. The excess oxygen may flow into the mask and may be available whenever the passenger inspirates, regardless of potential leakages and magnitude of the inspiration. This may give the passenger the opportunity to recover his consciousness.

Due to the variability of the pulse width control with two orders of magnitude (approximately 10-1000 ms), it may be possible, if applicable, to completely eliminate the control of the mask admission pressure; instead of a reduction of the oxygen flow used so far, the altitude-dependent metering can be simply realized by reducing the opening time while the flow remains the same.

According to an exemplary embodiment of the invention the oxygen supply system for an aircraft comprises a respiration device; a reservoir receptacle or reservoir bag; a valve element; a sensor device; wherein the respiration device is designed such in such a way that breathing air can be provided for a passenger; wherein the sensor device is designed in such a way that an oxygen content of the exhaled air can be measured during an exhalation of the passenger; wherein the reservoir bag is designed in such a way that a predetermined quantity of oxygen can be admixed to the breathing air in the reservoir bag during the exhalation of the passenger; wherein the valve element is designed in such a way that oxygen can be supplied to the reservoir bag until the predetermined quantity of oxygen is adjusted in the breathing air in the reservoir bag, and wherein the reservoir bag is designed in such a way that breathing air can be supplied to the respiration device in a pulse-like fashion.

According to an exemplary embodiment of the invention a method for supplying a passenger with oxygen in an aircraft comprises detecting an exhalation phase of a passenger; admixing a predetermined quantity of oxygen to the breathing air in a reservoir bag during the exhalation phase of the passenger, and supplying the breathing air from the reservoir bag to a respiration device in a pulse-like fashion.

BRIEF DESCRIPTION OF THE DRAWINGS

Below, the invention is explained in an exemplary manner with reference to the enclosed drawings. It should be pointed out that the embodiments of the invention shown in the figures explain the invention purely by way of examples, and in particular are not to be interpreted in a way as limiting the scope of protection of the invention. In the drawings.

DETAILED DESCRIPTION OF EXEMPLARY EMBODIMENTS

FIG. 1 to FIG. 4 show exemplary embodiments of a demand-oriented oxygen mask for passengers.

Figure 1:
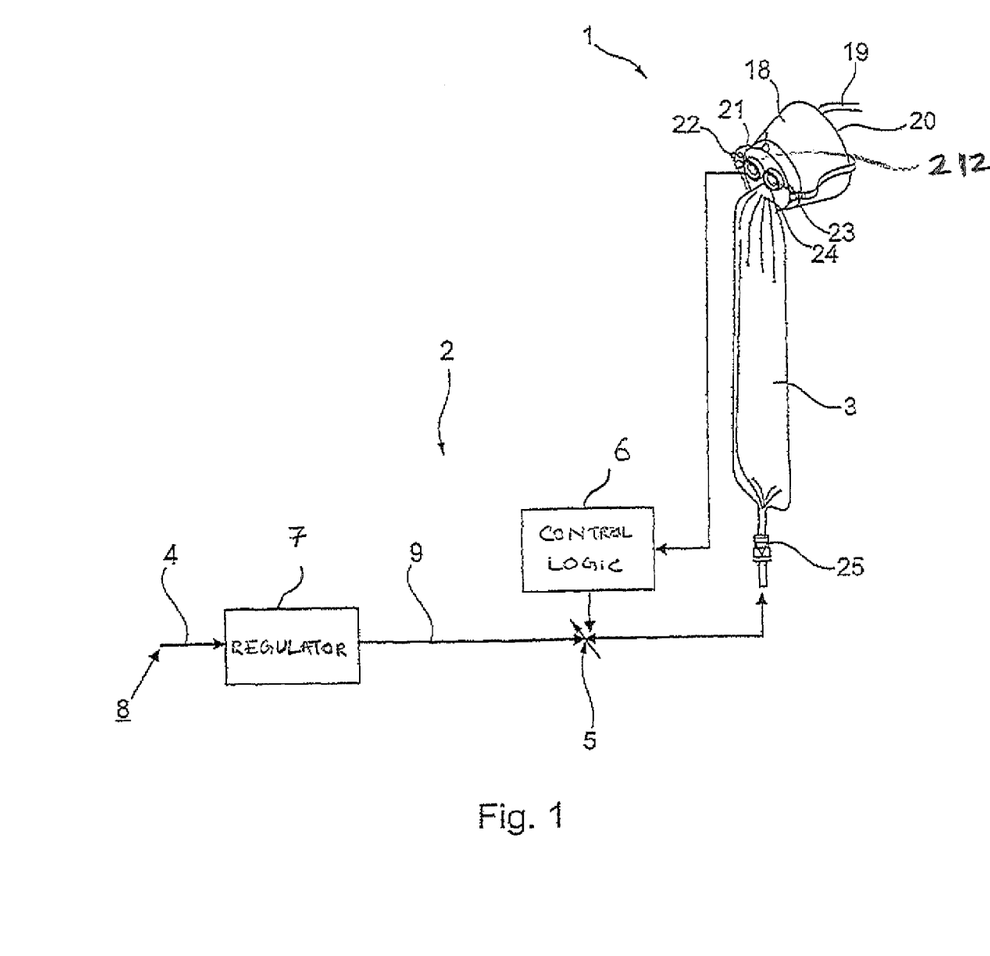
FIG. 1 shows an example of a TSO-C64a oxygen mask that provides an on-demand flow to a reservoir bag.

FIG. 1 shows an example of a TSO-C64a oxygen mask 1 which is outfitted with an oxygen distribution system 2 that provides an on-demand flow to a reservoir bag 3. The mask 1 comprises a cup-like semi-mask 18, which may cover the mouth and the nose of a passenger. The mask 1 may be fixed at the head of the passenger with the help of an elastic strap 19. This elastic strap 19 may ensure a sufficient contact pressure of a sealing lip 20 of the mask 1 to the face of the passenger. The mask 1 further comprises an exhalation valve 21, a sensor 22, an ambient air valve 23 and a reservoir bag valve 24. The mask 1 further comprises the reservoir bag 3. At the reservoir bag 3 there is a flow indicator 25 installed in order to indicate a flow from a control valve 5 into the reservoir bag 3, wherein the control valve is installed upstream in relation to the reservoir bag 3. From the reservoir bag 3, oxygen 4 is supplied to breathing air or gas, whereas the breathing air is usually a pure oxygen gas. This pure oxygen gas may be used in the second operation mode without any other additional gases. This pure oxygen gas may also be used in the first operation mode without any other additional gases for the first part of the breathing in order to provide a high oxygenation for the passenger. A switch 212 may be activated by the exhalation valve 21 as the passenger exhales. This means the valve 21 at the mask 1 may be activated by exhalation. A control logic 6 of a controller is actuated by the switch 212 or the exhalation and a regulator 7 regulates an oxygen supply 8 and a supply pressure 9 of the breathing air or breathing gas, which is pure oxygen. Therefore the logic 6 may be connected to a control valve 5. The regulator 7 functions as a pressure regulator. Especially it may be a pressure reducer. This means that pure oxygen from the oxygen supply may flow through the regulator 7 and arrives at the control valve 5. This may be opened in the case of oxygen supply into the reservoir bag 3, which open position may be controlled by the logic 6. The logic 6 may be a relay with a time delay control which may be realized by a mechanical function or the logic 6 may be a part of an electronic controller. Further alternatives may be also suitable. When the logic 6 controls the control valve 5 in such a way that the control valve 5 may be opened, then pure oxygen from the oxygen supply 8 may arrive inside the reservoir bag 3 for supplying the passenger with pure oxygen in either the first operation mode or the second operation mode. Thereby the exhalation of the passenger which uses the mask 1 may be detected.

The exhalation may be sensed in various ways, one solution may be a switch at the exhalation valve 21 which may be actuated during an opening of said valve 21. An other exemplary embodiments may comprise pressure, temperature, humidity, a gas component, oxygen or carbon dioxide sensors for a detection of the exhalation. In general every sensing device which can detect a breathing gas flow may be a possible application. The mask 1 may comprise one or more of these sensors 22.

The demand-oriented admixture of oxygen to the breathing air may be used to reduce the oxygen consumption without compromising the safety of the passengers.

Figure 2:
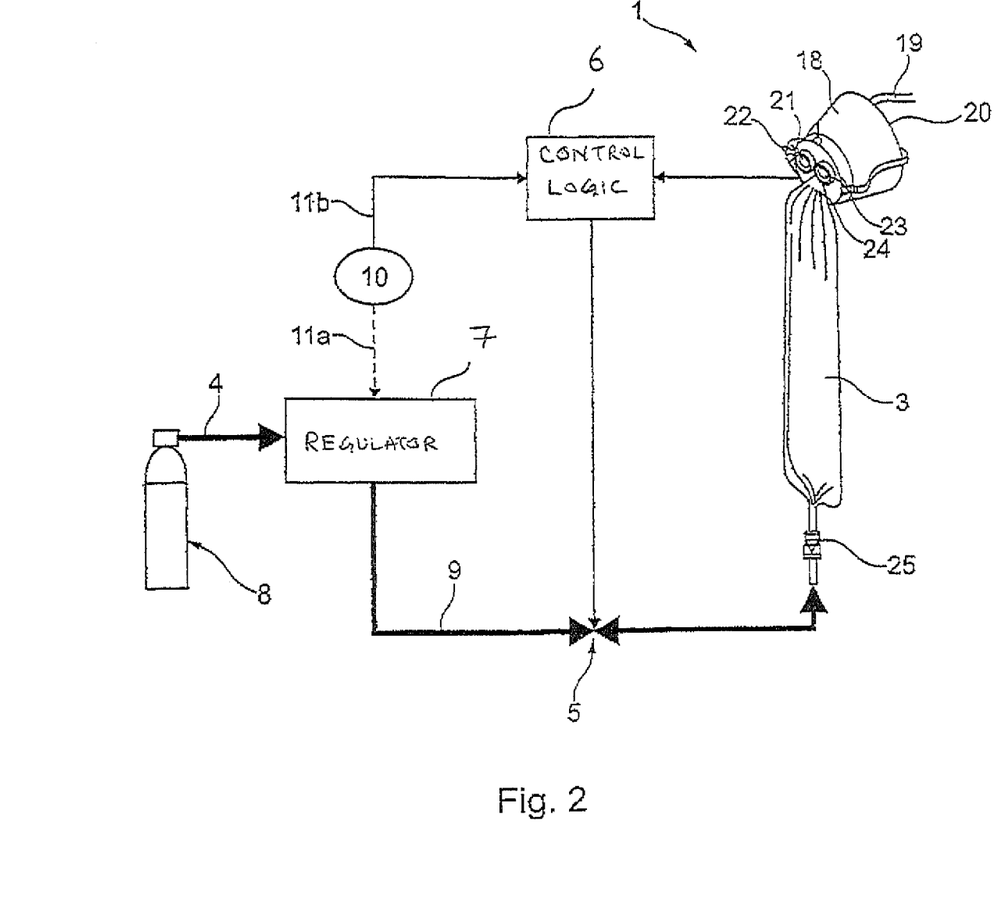
FIG. 2 shows one exemplary embodiment of an oxygen supply system for an aircraft.

FIG. 2 shows a further exemplary embodiment of the invention. The reservoir bag may be initially filled during the system activation. The exhalation activates the system, for example, by a switch on the breathing valve or exhalation valve 21. In addition, according to an exemplary embodiment of the invention the pressure differences, temperatures, humidity, chemical composition of the gas, like a carbon dioxide content may be measured with the aid of sensors in order to detect the exhalation. The reservoir bag 3 may be subsequently filled with oxygen during the exhalation phase. The filling volume may depend on the altitude (cabin altitude 10). In addition, the breathing rate or a breathing rate limit may also be taken into account.

The adaptation of the oxygen content to the altitude 10 may be realized in two different ways:
a.) altitude-adapted supply pressure and fixed valve opening times (variant 1, reference numeral 11a) or
b.) fixed supply pressure and altitude-adjustable valve opening times (variant 2, reference numeral 11b).

Figure 3:
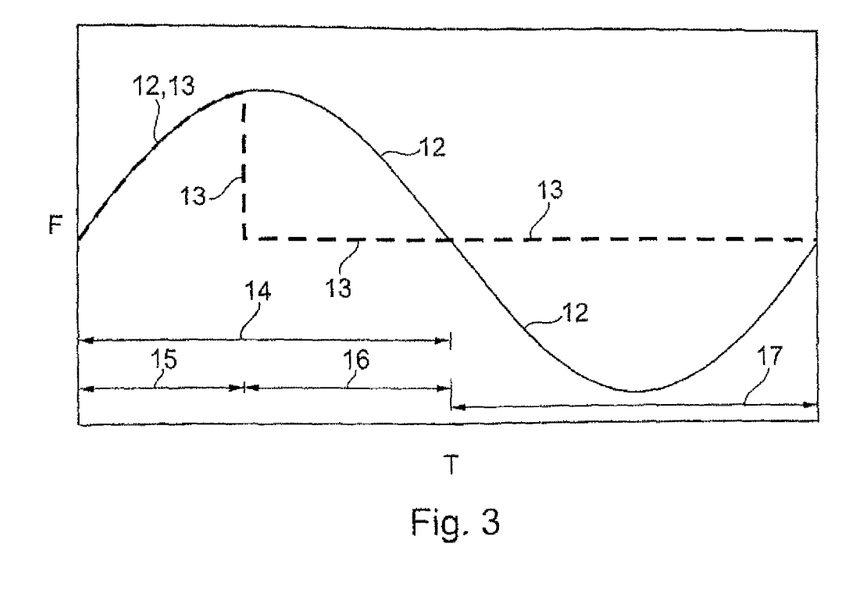
FIG. 3 shows a breathing cycle in a first operation mode and FIG. 4 shows a breathing cycle for the constant flow operating mode of the oxygen mask system in a second operation mode.

FIG. 3 shows a breathing cycle 12 for the demand oriented operating mode of the oxygen mask system. In the flow/time diagram (F for flow, T for time) according to FIG. 3, the oxygen flow 13 from the mask to the passenger is illustrated as a function of the passenger's breathing cycle. In this case, the inhalation phase 14 is divided into two stages:
a) undiluted oxygen 15 and
b) ambient air 16.

The exhalation 17 takes place into the ambience.

In FIG. 3 the inspiration is split into two phases, wherein the undiluted oxygen of the inhalation phase 14 may be terminated before the positive maximum of the breathing cycle (shown in FIG. 3) and as well after the positive maximum of the breathing cycle but before the end of the inhalation phase, meaning the positive half wave of the breathing cycle 12.

Figure 4:
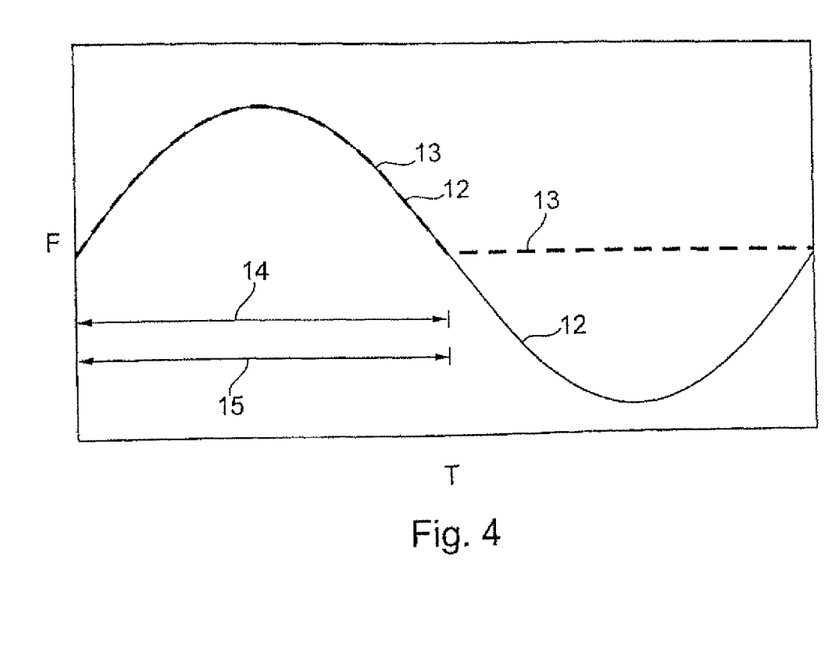

FIG. 4 shows a breathing cycle 12 for the constant flow operating mode of the oxygen mask system. In the flow/time diagram (F for flow, T for time) according to FIG. 4, the oxygen flow 13 from the mask to the passenger is illustrated as a function of the passenger's breathing cycle 12. In this case, the inhalation phase 14 comprises one stage:
a) undiluted oxygen 15

The exhalation takes place into the ambience.

According to this exemplary embodiment the changing from the first operation mode to the second operation mode is for all passengers the same parameter, wherein the changing takes place at the same time for all passengers. The changing from the second operation mode to the first operation mode may also be based on the same parameter for all passengers and may take place at the same time. The oxygen supply itself, meaning the amount of oxygen, the frequency of a pulse in the first operation mode and the time of starting the supply may be different for each passenger and may be adapted to the individual needs of each passenger based on the parameters provided by sensors at the respiration device.

In summary the exemplary embodiments of FIGS. 1 to 4 show exemplary embodiments of a demand-oriented oxygen mask which are suitable for a use in an aircraft in order to supply passengers in the case of a drop in pressure inside the passenger cabin. FIG. 3 shows an oriented operating mode of a mask system and FIG. 4 shows a high altitude mode with 100% oxygen supply of a mask system. Both modes may be combined within one mask system, wherein it is possible to change the operation mode of FIG. 3 or FIG. 4 to the other operation mode vice versa, respectively. This switching may depend on a certain parameter, which may be available in or outside the aircraft, such as the cabin altitude or the cabin pressure or a combination of different parameters.

As a supplement, it should be noted that "comprising" does not exclude any other elements or steps and that "a" or "an" does not exclude a plurality. It should furthermore be noted that characteristics or steps that were described with reference to one of the above embodiments may also be used in combination with other characteristics or steps of other above-described embodiments. The reference symbols in the claims should not be interpreted in a restrictive sense.

The invention claimed is:

1. An oxygen supply system for an aircraft, wherein the said system comprises:
   a control valve;
   a reservoir bag;
   a respiration device; and
   a sensor device;
   wherein the control valve is configured such that oxygen is supplied to the reservoir bag until a predetermined quantity of oxygen is adjusted in the reservoir bag;
   wherein the respiration device is configured such that breathing gas inside the reservoir bag is provided for a passenger;
   wherein the sensor device is configured such that an exhalation is detectable;
   wherein the reservoir bag is configured such that a predetermined quantity of oxygen is metered into the reservoir bag during the exhalation;
   wherein the reservoir bag is further configured such that breathing gas is supplied to the respiration device in a pulsed fashion responsive to the control valve;
   wherein the oxygen supply system is configured to operate in one of a first operation mode and a second operation mode;
   wherein the first operation mode is an on demand oxygen supply mode;
   wherein the second operation mode is a permanent oxygen supply mode; and
   wherein the system is configured to switch from the first operation mode to the second operation mode based on a first parameter determined either by a controller of the oxygen supply system or based on an output of at least one sensor and supplied to the controller of the oxygen supply system.

2. The oxygen supply system according to claim 1, wherein the oxygen supply system is configured to switch from the second operation mode to the first operation mode based on a second parameter determined by or supplied to a controller of the system.

3. The oxygen supply system according to claim 2, wherein at least one of the first parameter and the second parameter is an altitude of the aircraft.

4. The oxygen supply system according to claim 3, wherein the altitude is in a range of 25,000 ft to 45,000 ft.

5. The oxygen supply system according to claim 3, wherein the altitude is substantially 35,000 ft.

6. The oxygen supply system according to claim 2, wherein the oxygen supply system is switchable from the first operation mode to the second operation mode based on a third parameter determined by or supplied to the controller of the system,
   wherein the third parameter is selected from the group consisting of a temperature inside the mask, a temperature on the mask, a temperature of the breathing air of a passenger, a temperature inside the aircraft, a temperature outside the aircraft, a humidity, a differential pressure, an absolute pressure, a breathing gas composition, an amount of a carbonic acid gas, a pressure of the respiration system of the passenger, a breathing frequency, a chemical ingredient of a gas, an oxygen content, a carbon dioxide content, a chemical ingredient of a breathing gas, a chemical ingredient of a gas inside the mask, an altitude of the aircraft, a pressure inside the cabin of the aircraft, a chemical ingredient of a gas inside the aircraft and a chemical ingredient outside the aircraft.

7. The oxygen supply system according to claim 1, wherein the respiration device comprises an exhalation valve and a switch, wherein the switch is configured to be activated by the exhalation valve.

8. The oxygen supply system according to claim 1, wherein the oxygen supply system comprises a controller, wherein the controller is connected to the control valve.

9. The oxygen supply system of claim 1, wherein in the second operation mode, the oxygen is supplied at a constant flow.

10. A method for supplying a passenger with oxygen in an aircraft, wherein said method comprises:
    detecting an exhalation phase of a passenger;
    metering a predetermined quantity of oxygen to the breathing gas into a reservoir bag by a control valve during the exhalation phase of the passenger, and
    supplying the breathing gas from the reservoir bag to a respiration device in a pulsed fashion responsive to the control valve,
    wherein operating in a first operation mode or in a second operation mode is determined by a selectable parameter;
    wherein the first operation mode is an on demand oxygen supply mode;
    wherein the second operation mode is a permanent oxygen supply mode; and
    wherein the system is configured to switch from the first operation mode to the second operation mode based on a first parameter determined either by a controller of the oxygen supply system or based on an output of at least one sensor and supplied to the controller of the oxygen supply system.

11. The method according to claim 10, further comprising determining an altitude.

12. The method according to claim 10, further comprising determining a pressure.

13. The method according to claim 10, further comprising controlling the control valve in dependence of the pre-selected first operation mode or of the pre-selected second operation mode.

14. The method according to claim 10, wherein the system is configured to switch from the second operation mode to the first operation mode based on a second parameter determined by or supplied to a controller of the system.

* * * * *